Sept. 12, 1933.   C. STANSBURY   1,926,821
CURRENT REGULATING SYSTEM
Filed Feb. 27, 1930   2 Sheets-Sheet 1
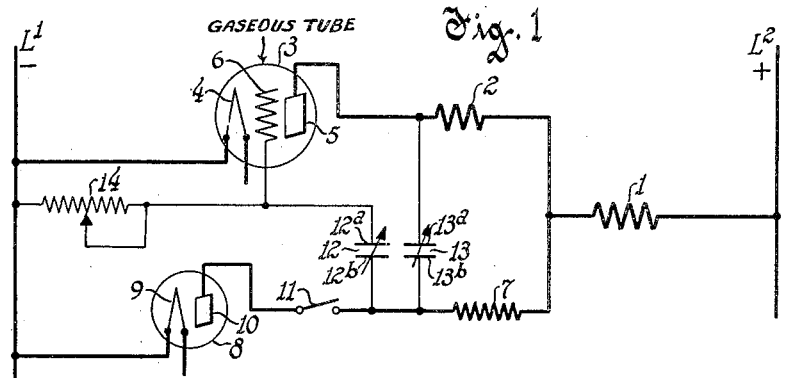
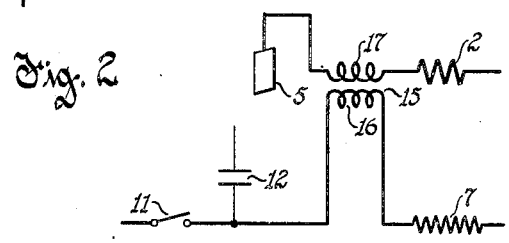
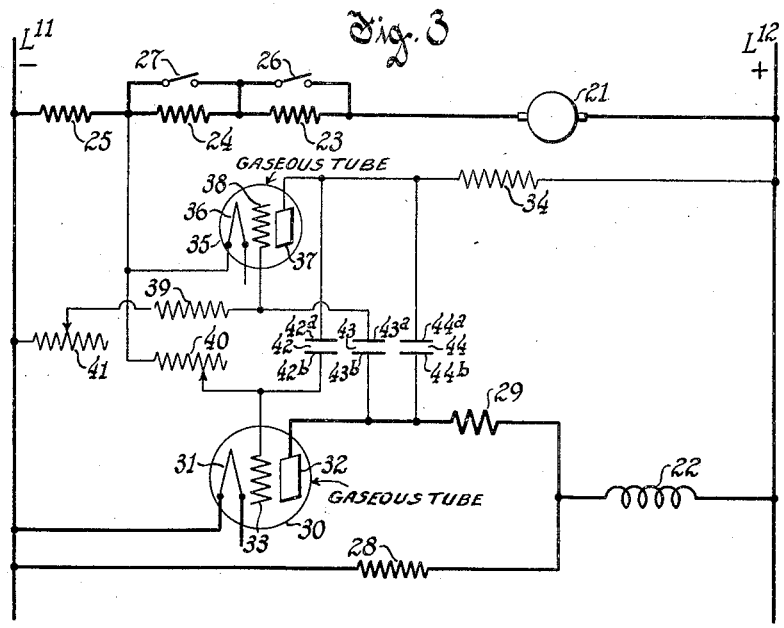
Inventor
Carroll Stansbury
By Frank H. Hubbard
Attorney Sept. 12, 1933.        C. STANSBURY              1,926,821
                   CURRENT REGULATING SYSTEM
                    Filed Feb. 27, 1930          2 Sheets-Sheet 2
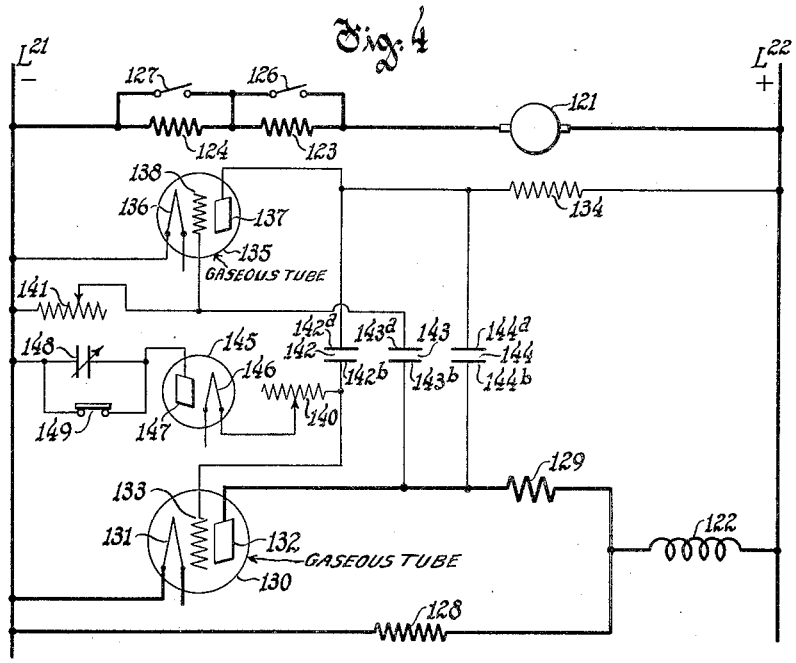
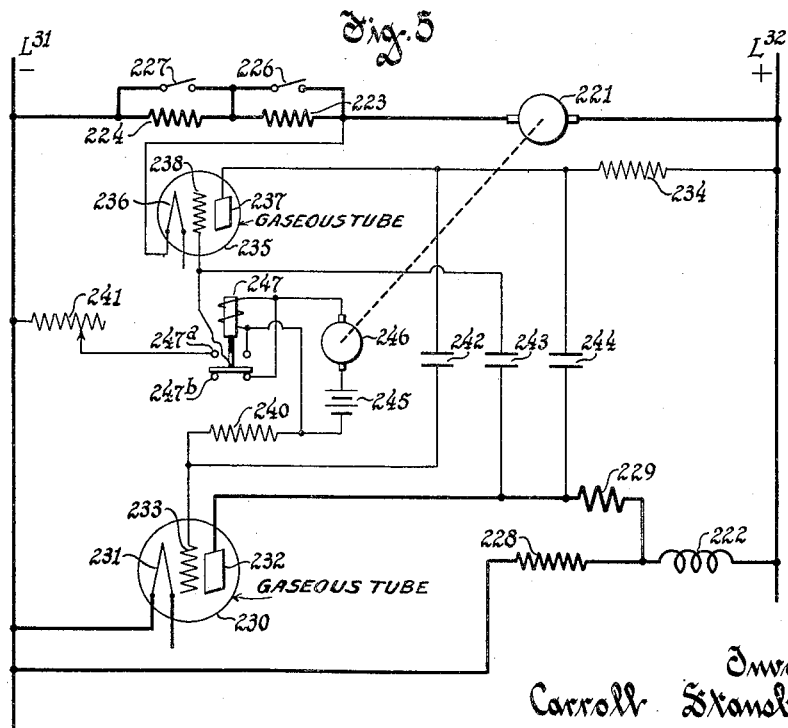
Inventor
Carroll Stansbury
By Frank H. Hubbard
Attorney

UNITED STATES PATENT OFFICE 1,926,821

CURRENT REGULATING SYSTEM

Carroll Stansbury, Wauwatosa, Wis., assignor to Cutler-Hammer, Inc., Milwaukee, Wis., a corporation of Delaware Application February 27, 1930. Serial No. 431,993

22 Claims. (Cl. 172—288)

This invention relates to the control of direct current circuits by electron tubes.

An object of the invention is to provide for starting and interrupting the flow of energy in a direct current circuit by an electron tube at will.

Another object is to obtain maximum and minimum values of a pusating current for regulable periods.

Another object is to provide means for regulating the average value of a pulsatory current in response to a given operating condition.

Another object is to provide means for regulating the rate of change with which the average of a pulsatory current varies from one value to another.

Another object is to provide improved means for controlling the excitation of a direct current dynamo electric machine in response to an operating condition.

Other objects and advantages will hereinafter appear.

In the accompanying drawings Fig. 1 is an elementary diagram illustrating the use of the invention in controlling the flow of current in a circuit.

Fig. 2 is a modification of the system illustrated in Fig. 1.

Fig. 3 illustrates the invention as applied to the control of the field excitation of a motor, while maintaining maximum field strength during the accelerating period.

Fig. 4 illustrates the invention as applied to the regulation of the rate of change of field excitation of a motor while varying such excitation between values corresponding to two different speeds.

Fig. 5 illustrates the invention as applied to the regulation of the field excitation of a motor in response to variations of its speed and additionally in response to variations in the armature accelerating resistance.

Referring to Fig. 1, $L^1$ and $L^2$ are respectively the negative and positive supply lines of a direct current circuit. 1 is a translating device, whose current is to be controlled. In circuit with the translating device is a relatively low resistance 2 and an electron tube 3, having a heated cathode 4, a plate 5 and a grid 6. The cathode 4 which is connected to line $L^1$ may be heated to the proper temperature in any desired manner. A second current path leads through the translating device, a relatively high resistance 7, the switch 11 and a hot cathode rectifier 8, having a heated cathode 9, which cathode may be heated in any well known manner, and a plate 10. A condenser 12, having plates 12a and 12b is connected between the grid 6 and the switch 11, while a second condenser 13, having plates 13a and 13b, which is of larger capacity than the condenser 12, is connected between the plate 5 and the switch 11. An additional high resistance 14 is connected between the grid 6 and the line $L^1$.

Assume that the switch 11 is open and the tube 3 is conducting, so that a current passes through the translating device 1, resistance 2, to the anode 5, cathode 4 and line $L^1$. Due to the voltage drop in the resistance 2 the condenser plates 12b and 13b have a positive potential and a corresponding negative potential is established at the opposite plates 12a and 13a. If now the switch 11 is closed, a current can pass through the tube 8, and as the impedance of the tube is relatively low, the potential of the condenser plates 12b and 13b drops instantly to a very low value, which is only slightly higher than the potential of the line $L^1$. The potential of the opposite plate of the respective condensers will follow this drop in potential, and the potential of plate 13a will render the anode 5 negative with respect to the cathode 4, thereby momentarily stopping the flow of current through the tube 3, resistance 2 and the translating device 1. At the same time the potential of the grid 6 becomes highly negative, and as long as the negative potential of the grid persists the tube cannot re-start. A small current, however, flows through the translating device 1, the resistance 7, the knife switch 11, the rectifier 8 to line $L^1$. The charge on the condenser plate 12a gradually leaks off through a path from the plate 12a through the resistance 14, line $L^1$ through the rectifier 8 and knife switch 11, back to the plate 12b, so that ultimately the potential of the grid 6 will approach that of the line $L^1$ and the cathode 4. Thus a current is again permitted to flow through the resistance 2 and the translating device 1.

The time interval during which the flow of current through the tube 3 can be stopped may be regulated, by regulating the impedance of the discharge path of the condenser 12, by regulating the value of the resistance 14, or, by varying the capacity of the condenser 12.

The system of Fig. 2 is similar to that of Fig. 1, except that the condenser 13 of Fig. 1 is replaced by the transformer 15. The primary winding 16 of said transformer is connected between the resistance 7 and the switch 11, while its secondary winding 17 is connected between the resistance 2 and the anode 5. When the switch 11 is closed, the sudden flow of current through tube 8 energizes the winding 16 and this induces a counter voltage in winding 17, which renders the anode 5 negative and stops flow through tube 3 as aforedescribed. When condenser 12 has been discharged, tube 3 becomes again conducting.

Referring to Fig. 3 it will now be shown, how this principle is used for the regulation of the field strength of a direct current motor, supplied from a direct current line.

$L^{11}$ and $L^{12}$ are respectively the negative and positive terminals of a supply line. 21 is a motor armature and 22 its shunt field winding. 23 and 24 are accelerating resistors, which may be cut out in any well known manner, as by means of resistance switches 26 and 27 respectively. 25 is an impedance, the purpose of which will be clear from the following explanation.

In series with the shunt field 22 is a resistance 28 and a second path parallel to resistance 28 leads through resistance 29, the electron tube 30, having a cathode 31, an anode 32 and a grid 33 back to the line $L^{11}$. The cathode 31 may be heated by any well known means. There is also provided a resistance 34 connected to the line $L^{12}$ and in series with an electron tube 35, having a cathode 36, an anode 37 and a grid 38. The cathode 36 is connected to a point intermediate of the resistance 24 and the impedance 25. A resistance 39 in series with an additional adjustable resistance 41 connects the grid 38 to line $L^{11}$, while a further adjustable resistance 40 is connected between cathode 36 and the grid 33. A condenser 42 is connected between the plate 37 and the grid 33. A second condenser 43 is connected between grid 38 and the plate 32, while a third condenser 44 connects the plate 32 with the plate 37.

If it is desired to start the motor, the system is connected to the supply lines and current flows from the line $L^{12}$ to armature 21, through the resistances 23 and 24 and impedance 25 to line $L^{11}$. Current also flows from the line $L^{12}$ through the field winding 22 and the resistor 28 to line $L^{11}$. As the point between resistance 24 and impedance 25 to which the grid 33 is connected is positive with respect to the cathode 31, current can flow through the tube 30 and through the resistance 29 which has a lower value than resistance 28, so that the field 22 carries a relatively high current. On the other hand no current can start to flow through tube 35, because the grid 38 thereof is highly negative with respect to the cathode 36, due to the voltage drop across the impedance 25. Therefore also no current flows through the resistance 34.

To accelerate the motor the switches 26 and 27 are closed in succession. As these switches are closed the accelerating resistances 23 and 24 are eliminated from the motor armature circuit. When the motor has accelerated, the armature current decreases to a normal value, thus reducing the voltage drop through impedance 25. As a result of this the grid 38 becomes less negative with respect to cathode 36, so that it cannot any more prevent the flow of current in tube 35. A current then flows from line $L^{12}$ through the resistance 34 through the tube 35 and impedance 25 to line $L^{11}$. The potential of the condenser plates 42a and 44a was approximately that of the positive line $L^{12}$ before the tube 35 started. Due to the sudden flow of current this positive potential is suddenly reduced to a low value with the result, that the potentials of the opposite plates of the respective condensers drop correspondingly. This makes the anode 32 negative with respect to the cathode 31 and the current flow through the tube 30 and the resistance 29 is stopped, so that the current passing through the motor field 22 is limited by the relatively high resistance 28 and the field strength is diminished accordingly. The tube 30 cannot start immediately, even after the discharge of the condenser 44, as the grid 33 is negative. The negative charge gradually leaks off from the grid and the condenser plate 42b, through the resistance 40, tube 35, back to condenser plate 42a. As soon as the potential of the grid 33 has again reached a relatively low value, current flow through the tube 30 and the resistance 29 is reestablished, so that now the motor field 22 again receives a relatively high current. The starting of the current through the tube 30 suddenly reduces the relatively high positive potential on the condenser plates 43b and 44b so that the potential of the opposite plates attains a corresponding negative value. This causes the anode 37 of tube 35 to become negative with respect to the cathode 36 and the current flow through said tube and the resistance 34 is stopped and is prevented from restarting, until the negative potential of the grid 38 has been reduced by a discharge current flowing over a path from the grid and the plate 43a, through the resistance 39, adjustable resistance 41 and through the tube 30, back to plate 43b. As soon as the grid 38 has again attained its normal potential the tube 35 becomes again conducting and the cycle described above is repeated.

It will be seen that the time which is required for the tube 30 to re-start after it has been extinguished, may be adjusted by adjustment of resistance 40 or variation of condenser 42, while the time during which the current through the tube 35 is stopped may be adjusted by adjustment of the resistance 41 or variation of the condenser 43. It is thus obvious that this system permits of individual adjustment of the time intervals during which the current in the field 22 has a relatively high and a relatively low value, thus making it possible to adjust the average value of the field current which continuously varies between such low and high values. It is also apparent that this arrangement insures, that the motor always starts with maximum field strength and that the regulating means only become effective after the motor has attained approximately its normal speed and the accelerating current has been reduced to approximately its normal value. If the motor current varies, the voltage drop through the impedance 25 varies. This causes a corresponding variation of the bias of grids 38 and 33, thereby varying the relative time during which the tubes 30 and 35 are conducting. Thus the average field current gradually changes to the value determined by the operating conditions.

It will further be apparent, that any variation of the armature current produces a corresponding variation of the grid bias of the tubes 30 and 35, thus varying the timing of said tubes and the resulting average field current in accordance with such armature current variation, as explained above. Hence any rapid alteration of any adjustment of the controller, which tends to produce a corresponding transient change of armature current, affects the timing of the tubes in the aforedescribed manner and thereby reduces the magnitude of such transient current.

In Fig. 4, $L^{21}$ and $L^{22}$ are respectively the negative and positive terminals of a direct current supply system. 121 is the armature and 122 the shunt field winding of a direct current motor, the field of which is to be controlled, so as to have a relatively high average value under certain conditions and a relatively low value under other conditions.

In series with the armature 121 are the starting resistances 123 and 124, which may be short circuited by the starting switches 126 and 127 respectively. The armature resistance starter forms no part of the present invention and may be of any known type. In series with the shunt field winding 122 is a relatively high resistance 128. A second resistance 129 of lower value is in series with a tube 130, having a cathode 131, an anode 132 and a grid 133, and this resistance and tube are connected in parallel with resistance 128. A resistance 134 is connected to the positive line and is in series with the electron tube 135, having a cathode 136, an anode 137 and a grid 138, the cathode 136 being connected to the negative line. One side of a resistance 140 is connected to the grid 133, the other side of said resistance is connected to the cathode 146 of a rectifier 145, whose anode 147 is connected to the line $L^{21}$ through an adjustable condenser 148, which may be shunted by a switch 149. A condenser 144 is connected between the respective anodes of the tubes 130 and 135. A second condenser 142 is connected between the anode 137 and the grid 133, while a third condenser 143 is connected between the grid 138 and the anode 132. A relatively high resistance 141 completes a circuit from the grid 138 to the negative line.

The controller operates as follows: Under normal conditions the switch 149 is closed and condenser 148 short circuited. When the lines $L^{21}$, $L^{22}$ are energized the potential of the grid 138 with respect to the cathode 136 is such as to permit a current to flow through tube 135 and the resistance 134. This flow of current produces a negative potential on the plate 142a of condenser 142 and a corresponding positive potential on the other plate 142b of said condenser. The grid 133 being positive with respect to the cathode 131 permits a current to flow through the tube 130 and the resistance 129, thus parallelling the resistance 128, so that a relatively high current flows through the field winding 122. The starting of the current through the tube 130 suddenly lowers the positive potentials on the condenser plates 143b and 144b, so that the potentials on the opposite plates 143a and 144a of these condensers are suddenly lowered to values which reduce the grid and plate potentials of tube 135 and stops the flow of current through said tube. This in turn again affects the grid and plate potential of tube 130 in the manner aforedescribed, so that the flow through tube 130 and resistance 129 again is interrupted and a relatively low current flows. This cycle is repeated as explained heretofore. The resistance 141 and the condensers 142 and 143 are so proportioned, that the time during which the tube 130 is conducting is relatively long, while the time during which the tube is non-conducting is relatively short, so that a current of a high average value flows through the field winding during practically the entire cycle and the average field strength is accordingly high.

If it is now desired to weaken the field and such weakening to the lower average value is to take place in a definite time, the switch 149 is opened, thus placing the condenser 148 in series with the rectifier 145 which rectifier has a relatively low impedance, that is, the voltage drop between the anode and cathode is low. If now at the moment when the tube 135 starts, a high negative potential is impressed upon the grid 133, this potential will gradually discharge through the resistance 140, the tube 145 and the condenser 148. As the capacity of the condenser 148 is considerably greater than the capacity of the condenser 142, the initial discharge of the condenser 142 will take place in a relatively short time, and a corresponding charge will be accumulated upon the condenser 148. Thus the time during which tube 130 is non-conducting is relatively short. On the next cycle the discharge of the condenser 142 will take a slightly longer time, because the apparent impedance of the discharge circuit is increased on account of the counter-electromotive force of the partly charged condenser 148. Thus with every cycle the time during which the tube 130 is rendered non-conducting is lengthened until ultimately the negative potential on the grid 133 is not reduced any more sufficiently to permit the tube 130 to become conducting and thereafter the field current is limited by the resistance 128. It will be observed, that the current in rectifier 145 can only flow in one direction, which prevents the condenser 148 from discharging, when switch 149 is open.

If it is desired again to operate the motor field at its maximum value, switch 149 is closed. This causes instant discharge of condenser 148, whereupon the regulator operates again as aforedescribed to regulate the average field current.

This system may be applied to electric elevator motors, in which it is desired to produce gradual field weakening in a definite time interval after the motor has been accelerated and all of the armature resistance has been cut out of circuit. In this case the switch 149 may be operated by the last accelerating switch or it may be mounted in the car switch and be subject to control at the will of the operator.

Fig. 5 is another modification of the invention. In this figure there is illustrated a motor having an armature 221 and a shunt field winding 222. The electron tubes 230 and 235 correspond respectively to the electron tubes 30 and 35 of Fig. 3. This system differs from Fig. 3 only in the connections of the grids 233 and 238 respectively. Coupled with the armature 222 is a generator 246, hence the voltage of the latter is proportional to the speed of the motor 221. In opposition to the generator 246 is battery 245. An electromagnet 247 having normally open switch members 247a and normally closed switch 247b is connected to the generator and battery, so that the electromagnet is energized by a voltage which is the difference of the generator and battery voltage. As long as the voltage of the generator that is the speed of motor 221, is low, the relay coil 247 is sufficiently energized to attract the armature and cause the contact 247a to close. The connections of the various elements is then similar to those shown in Fig. 3, and the time during which the tube 230 is conducting is relatively long, so that the field 222 obtains a high average energizing current. However, as soon as the motor 221 has accelerated, so that the voltage of generator 246 approximates the voltage of the battery 245, the current in the relay coil 247 decreases sufficiently to cause the opening of the contact 247a and closure of contact 247b. Under these conditions the negative charge of the grid 233 discharges over resistance 240, magnet coil 247, grid 238, plate 237 to condenser 242, the discharge time being affected by the voltage drop in coil 247, i. e. the speed of the motor. Thus the time during which tube 230 is non-conducting is also a function of the motor speed and varies with it. As a result the motor field strength varies as a function of the motor speed.

It will be obvious that with the relay 247 in its attracted position and by virtue of the connection of the cathode 236 between the armature and the regulating resistance, the operation is affected in a manner similar to that shown in Fig. 3, where the cathode 36 is connected to an intermediate point of the armature regulating resistance, so that variations in the regulating resistance will also affect the operation of the system of Fig. 5, that is the field of the motor is temporarily strengthened upon a decrease of the armature regulating resistance and is temporarily weakened upon an increase of the armature regulating resistance. Hence Fig. 5 illustrates a system in which the motor field strength is controlled in accordance with the speed of the motor, such control being modified in response to variations of the armature current.

It will also be obvious that the effect of the impedance 25 in Fig. 3, the condenser 148 in Fig. 4 and the resultant E. M. F. of battery 245 and generator 246 in Fig. 5 upon the discharge time of the corresponding grid circuit is the same, namely, the introduction of a relatively small counter-electro-motive-force in the discharge circuit lengthens the time during which the grid remains negative, while an electro-motive-force of the same polarity as the discharge current shortens such time.

In Fig. 5 this electro-motive-force affects the discharge circuits of grids 240 and 238 oppositely, its polarity depending on the direction of the speed change of the motor 221.

What I claim as new and desire to secure by Letters Patent is:

1. The method of controlling the current flow from a direct current circuit through a vapor discharge path, which consists in stopping the flow of current by impressing a transient potential upon the discharge path and delaying restarting of the flow by subjecting the discharge path to the influence of a transient electric field.

2. The method of controlling the current flow from a direct current circuit through a vapor discharge path, which consists in stopping the flow of current by impressing a transient potential upon the discharge path and delaying restarting of the flow by subjecting the discharge path to the influence of an electric field produced by transcient effects of an energy storage circuit.

3. In a direct current circuit a uni-directional gaseous discharge tube having an anode and grid, means to impress transient potentials upon said anode and grid to stop the discharge current of the tube, and a discharge circuit associated with said grid and controlling the rate of discharge of the transient potential on the grid.

4. In a direct current circuit a uni-directional gaseous discharge tube having an anode and grid, means to impress transient potentials upon said anode and grid to stop the discharge current of the tube and an energy storing discharge circuit associated with said grid to control the rate of discharge of the transient potential on the grid.

5. In a direct current circuit a uni-directional gaseous discharge tube having an anode and grid, means to impress transient potentials upon said anode and grid to stop the discharge current of the tube, and an adjustable energy storage circuit which retards the discharge of the transient potential on said grid, whereby the rate of discharge of the transient potential impressed upon the grid may be regulated.

6. In a direct current circuit a uni-directional gaseous discharge tube having an anode and grid, means to impress transient potentials on said anode and grid to stop the flow of current through the tube, and means to maintain the transient potential on said grid for an interval to thereby maintain the tube temporarily in a non-conducting condition.

7. In a direct current circuit a uni-directional gaseous discharge tube having an anode and grid, means to impress a transient potential upon said anode to temporarily stop the flow of current through the tube, further means to impress a transient potential upon the grid and means to maintain said latter transient potential for an interval to thereby maintain the tube temporarily in a non-conducting condition.

8. In a direct current circuit a uni-directional gaseous discharge tube having an anode and grid, means to impress transient potentials upon said anode and grid to stop the flow of current through the tube, and an adjustable energy storage circuit whereby the time interval during which the grid maintains the tube non-conducting may be regulated.

9. In a direct current circuit a uni-directional gaseous tube having an anode and grid, means to impress a transient potential upon said anode to stop the flow of current through the tube, additional means to impress a transient potential upon the grid to thereby maintain the tube non-conducting pending discharge of the transient potential of the grid, and an adjustable energy storage circuit whereby the time interval during which the grid maintains the tube non-conducting may be regulated.

10. In combination a direct current supply, a translating device, a gaseous discharge tube in circuit with the translating device and the supply and having an anode and grid, means to impress transient potentials on said anode and grid to stop the flow of current through said tube and said translating device, and an adjustable energy storage circuit whereby the time interval during which the grid maintains the tube non-conducting may be regulated.

11. In combination a direct current supply, a translating device, a gaseous discharge tube having an anode and grid, a second tube normally disconnected from circuit, means to connect said second tube in circuit and to produce transient potentials on said anode and grid which stop the flow of current through the first tube, and an adjustable energy storage circuit whereby the time interval during which the grid maintains the tube non-conducting may be regulated.

12. In combination, a direct current supply, a translating device, a gaseous discharge tube in circuit with said translating device and said supply, and having an anode and grid, a second tube having an anode and grid, means associated with each tube to produce transient potentials upon the anode and grid of the other tube to stop the flow of current therethrough, and adjustable energy storage circuits whereby the time intervals during which the grids maintain their respective tubes non-conducting may be regulated.

13. In combination a direct current supply, a translating device, a gaseous discharge tube in circuit with said translating device and said supply and having an anode and grid, a second tube having an anode and grid, energy storage means associated with each tube and capable of producing transient potentials on its anode and grid as a function of starting of current flow in the other tube, and adjustable energy storage circuits, whereby the time intervals during which the grids maintain their corresponding tubes non-conducting may be regulated.

14. In combination, a direct current supply, a dynamo-electric machine having an armature and a field winding connected to said supply, a gaseous discharge tube in circuit with the field winding and having an anode and a grid, means to impress transient potentials upon said anode and grid to stop the discharge current of the tube, said means being responsive to an operating characteristic of said machine, and an adjustable energy storage circuit associated with the grid and the machine circuit whereby the rate of discharge of the transient potential on the grid may be regulated, such rate of discharge being modified in accordance with an operating condition of the machine.

15. In combination, a direct current supply, a motor having an armature and field winding connected to said supply, a gaseous discharge tube in circuit with the field winding and having an anode and a grid, means to control the current supplied to said field by said tube, said means including means to impress transient potentials upon said anode and grid to stop the discharge current of the tube and having a connection to the motor armature circuit so as to be responsive to the speed of the motor, said connection including adjustable energy storage means, whereby the rate of discharge of the transient grid potential varies in accordance with the motor speed and may in addition be regulated at will.

16. In combination, a direct current supply, a translating device, a gaseous discharge tube in circuit with said translating device and said supply and having an anode and a grid, means to impress transient potentials upon said anode and grid to stop the discharge current of the tube, and an adjustable energy storage circuit responsive to an operating characteristic of said translating device, whereby the rate of discharge of the transient potential on the grid may be regulated.

17. In combination, a direct current supply, a translating device, a gaseous discharge tube in circuit with said translating device and said supply and having an anode and grid, a second tube having an anode and grid, energy storage means associated with each tube and capable of producing transient potentials on its anode and grid as a function of starting of current flow in the other tube, and adjustable energy storage circuits responsive to an operating characteristic of said translating device, whereby the time intervals during which the grids maintain their corresponding tubes non-conducting may be regulated.

18. In combination, a dynamo electric machine having a field winding supplied with direct current, a gaseous discharge tube in circuit with said field winding and having an anode and a grid, means to impress transient potentials upon said anode and grid to stop the discharge current of the tube, said means being responsive to an operating characteristic of said machine and an adjustable energy storage circuit whereby the rate of discharge of the transient potential on the grid may be regulated.

19. In combination, a dynamo electric machine having a field winding supplied with direct current, a gaseous discharge tube in circuit with said field winding and having an anode and a grid, means to impress transient potentials upon said anode and grid to stop the discharge current of the tube, said means including an adjustable energy storage circuit associated with the grid and responsive to an operating characteristic of the machine whereby the rate of discharge of the transient potential on the grid is regulated in accordance with an operating condition of the machine.

20. In combination, a dynamo electric machine having a field winding supplied with direct current and an armature, a gaseous discharge tube in circuit with the field winding and having an anode and a grid, means to control the current supplied to said field winding by said tube, said means including means to impress transient potentials upon said anode and grid to stop the discharge current of the tube and having a connection to the armature circuit so as to be responsive to an operating characteristic of the machine, said connection including an adjustable energy storage means, whereby the rate of discharge of the transient grid potential varies in accordance with the operating conditions of the machine and may, in addition, be regulated at will.

21. In combination, a motor having a field winding supplied with direct current and an armature, a gaseous discharge tube in circuit with the field winding and having an anode and a grid, means to control the current supplied to said field winding by said tube, said means including means to impress transient potentials upon said anode and grid to stop the discharge current of the tube and having a connection to the motor armature circuit so as to be responsive to current conditions in the latter, said connection including adjustable energy storage means whereby the rate of discharge of the transient grid potential varies in accordance with the armature current and may, in addition, be regulated at will.

22. In combination, a motor having a field winding supplied with direct current and an armature, a gaseous discharge tube in circuit with the field winding and having an anode and a grid, means to control the current supplied to said field winding by said tube, said means including means to impress transient potentials upon said anode and grid to stop the discharge current of the tube and having a connection to the motor armature circuit so as to be responsive to the speed of the motor, said connection including adjustable energy storage means whereby the rate of discharge of the transient grid potential varies in accordance with the motor speed and may, in addition, be regulated at will.

CARROLL STANSBURY.